Feb. 14, 1956     E. P. FINNEGAN     2,734,270
MEANS FOR MEASURING TROUSER LENGTHS
Filed Oct. 30, 1952
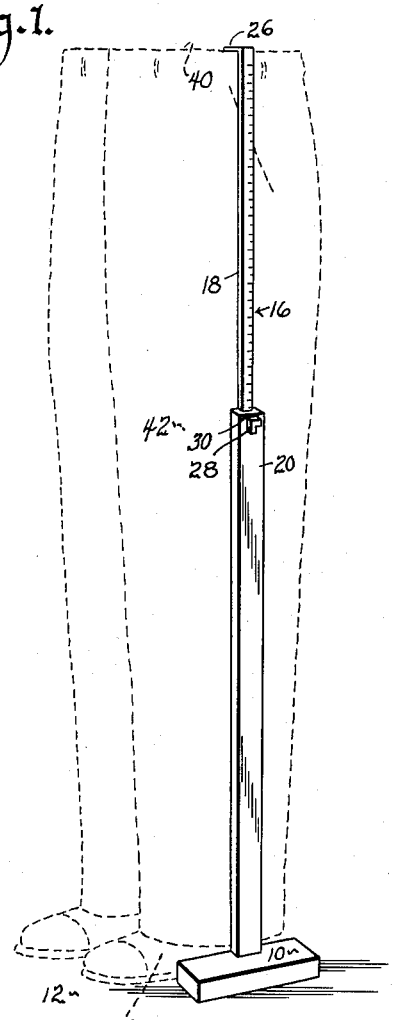
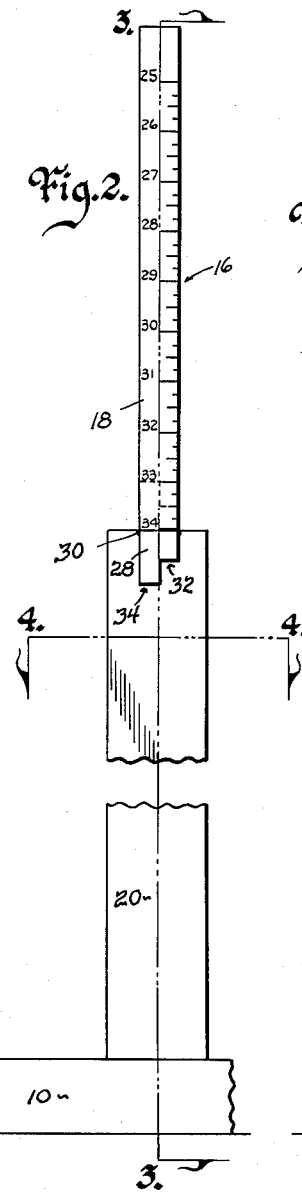
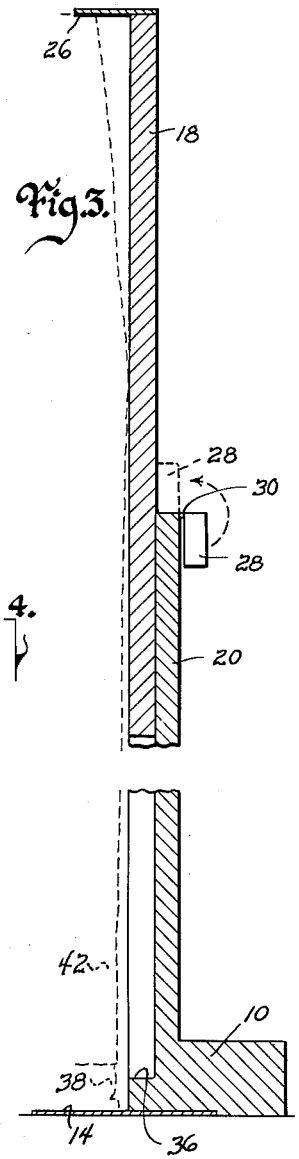
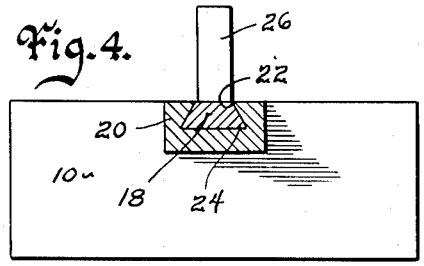
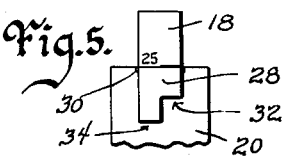
Inventor
Edward P. Finnegan
by Talbert Dick & Adler
Attorneys
Witness
Edward P. Seeley

| United States Patent Office | 2,734,270 |
|---|---|
| | Patented Feb. 14, 1956 |

2,734,270
MEANS FOR MEASURING TROUSER LENGTHS

Edward P. Finnegan, Mason City, Iowa

Application October 30, 1952, Serial No. 317,712

1 Claim. (Cl. 33—8)

My invention relates to the art of measuring ready-made trousers which must be finished to the proper trouser length for the particular individual who purchases them. Specifically I have invented a means for measuring trousers to establish the proper length of the trousers.

The common procedure for measuring pants length of ready-made trousers used by the salesman or tailor is to measure the inseam of the pants on the purchaser with a tape. This technique when used by a skilled person is accurate enough, but even an expert sometimes errs in making this measurement. Frequently the salesman as distinguished from a tailor is relatively poor at measuring, and the tailor is led to make the trousers an inappropriate length. The purchaser returns such trousers for further alteration and the cost of having this additional tailoring done is very high in some cases.

Also, there are several different pants lengths to which different men prefer to have their trousers adjusted. Some prefer to have the pant leg hang straight down without engaging the top of the shoe sufficiently to cause the pants crease to wrinkle or "break" as this distortion of the crease is known. Others prefer a mild or "half break" while there is a third group that prefer what is known as a "full break." The difficulty of making the measurement correctly in the first place plus the variations required by various purchasers as to the "break" in the crease leads to a great deal of effort being expended in adjusting the length of the trousers a second or even a third time in many cases.

In view of the foregoing it is the principal object of my invention to provide an accurate means of measuring trouser length.

It is a further object of my invention to provide a device for measuring the outseam of trousers accurately.

It is a further object of my invention to provide a means for measuring trouser length that requires no special knowledge or skill in measuring on the part of the salesman.

It is a further object of my invention to provide a means for measuring trouser length that provides a direct measurement for various "break" requirement without the necessity of any calculating on the part of the person using the device.

It is a further object of my invention to provide a trouser length measuring device that is economical to manufacture, durable in use and refined in appearance.

These and other objects will be apparent to those skilled in the art.

My invention consists of the method described and the means resulting from the construction and arrangement of the various parts of the device, whereby the objects contemplated are attained as hereinafter more fully set forth, pointed out in my claim, and illustrated in the accompanying drawings, in which:

Fig. 1 is a perspective view of my trouser length measuring device shown measuring a pair of trousers illustrated in broken lines.

Fig. 2 is an enlarged front elevation view of the device with a portion broken away to conserve space.

Fig. 3 is an enlarged longitudinal sectional view of the device taken on the line 3—3 of Fig. 2. Broken lines show an adjusted position for the break compensator and also a fragment of a trouser leg being measured, Fig. 4 is an enlarged cross-sectional view taken on the line 4—4 of Fig. 2, and Fig. 5 is a front elevation detail view of the break compensator shown to approximately the same scale as Figs. 2, 3 and 4.

Referring to the drawings I have used the numeral 10 to designate the base of my measuring device which rests on any suitable horizontal surface such as floor 12 or the like where the potential customer can stand to be measured. If desired a stabilizing plate such as the one designated 14 may be secured to the base 10. If this plate is used, a person being measured stands on the plate to secure the device against being knocked over by the person being measured. This plate structure is not essential to the successful operation of my device, however, and I show it merely as a preferred form of the device. The thickness of the plate is taken into account on the measuring scale 16 that is imprinted on slide 18. The slide is slidably mounted, as its name suggests, in the vertical column 20 which is rigidly secured to the base and extending vertically therefrom. The slide and column are secured together in any suitable manner such as the complementary dovetail form of structure shown in Fig. 4. However, any structure that provides flanges on the column such as the ones designated 22 and lips on the slide such as those designated 24 will serve to secure the slide to the slide in the column without inhibiting sliding movement therebetween. A tongue 26 is secured to the top of the slide and extends from the slide in a direction toward a person being measured and away from the scale 16. At the top of the column is the L-shaped break compensator generally designated 28 and secured to the column by some suitable hinge means such as the one designated 30. The compensator has two steps on it; a lower one designated 32, and an upper one designated 34. When the compensator is in the upwardly hinged position as shown by the broken line in Fig. 3, the bulk of the compensator covers the measuring indicia immediately above the column which reduces the length of the measurement indicated by the device. The upper step designates a trouser length for any given waist height that will give the pants an unbroken "straight hang." The lower step designates a trouser length that will produce a "half break" while the "full break" measurement is read directly above the top of the column by hinging the compensator out of the way. The column is provided with a positive stop designated 36 which causes the slide to stop at exactly the smallest figure shown on the slide as illustrated in Fig. 5.

To use my device, it is placed adjacent to the outside of the leg of the customer. The shoe of the customer such as the one designated 38 engages the plate 14 and the slide is extended manually until the tongue 26 is above the waist band 40 of the trousers 42. The slide is then lowered until it barely contacts the band 40. Break compensator 28 is adjusted to permit the correct measurement reading depending on the preference of the customer and the pants length is then read directly from scale 16.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my means for measuring trouser length without departing from the real spirit and purpose of my invention, and it is my intention to cover by my claim, any modified forms of structure or use of mechanical equivalents which may be reasonably included within their scope.

I claim:

In a trouser length measuring device, a base, a column secured to said base and having a channel therein; a single slide with a single graduated scale mounted in said channel; and an L-shaped break measuring device secured to the top of said column complementing said slide and scale so that the outside seam of trousers may be measured permitting varied degrees of break; said base comprising a thin plate at the side of the column where the person to be measured stands, and a relatively thick portion at the side of the column opposite from the side where the person to be measured stands.

References Cited in the file of this patent

UNITED STATES PATENTS

| Number | Name | Date |
|---|---|---|
| 167,957 | Ullrich | Sept. 21, 1875 |
| 791,039 | Mertz | May 30, 1905 |
| 938,280 | Sextone | Oct. 26, 1909 |
| 950,403 | Reesberg | Feb. 22, 1910 |
| 1,022,005 | Shrader | Apr. 2, 1912 |
| 1,053,964 | Atwell | Feb. 25, 1913 |
| 1,624,768 | Simpson | Apr. 12, 1927 |
| 1,741,174 | Weber | Dec. 31, 1929 |
| 2,125,530 | Verdier | Aug. 2, 1938 |
| 2,182,953 | Turpan | Dec. 12, 1939 |
| 2,465,778 | Yunger | Mar. 29, 1949 |
| 2,501,948 | Knipp | Mar. 28, 1950 |
| 2,665,483 | Sabatini | Jan. 12, 1954 |
| 2,677,889 | De Pew | May 11, 1954 |